United States Patent [19]

Vaughan

[11] Patent Number: 4,750,525
[45] Date of Patent: Jun. 14, 1988

[54] END CLOSURE FOR FLEXIBLE PLASTIC TUBES

[76] Inventor: Daniel J. Vaughan, 36 Paxon Dr., Wilmington, Del. 19803

[21] Appl. No.: 722,948

[22] Filed: Apr. 15, 1985

[51] Int. Cl.⁴ .................. B65D 45/32; F16L 21/08
[52] U.S. Cl. ........................... 138/89; 29/450; 29/517; 138/109; 150/55; 220/320; 229/5.7; 285/423
[58] Field of Search ............ 206/527, 526, 45.34, 206/524.1, 524.6; 138/89, 91, 96 R; 229/5.7, 4.7; 215/1 C; 383/96

[56] References Cited

U.S. PATENT DOCUMENTS

| | | | |
|---|---|---|---|
| 1,692,969 | 11/1928 | Van Voorhis | 383/96 |
| 2,433,602 | 12/1947 | Coss | 285/242 |
| 2,688,498 | 9/1954 | Wilson | 285/254 |
| 2,741,498 | 4/1956 | Elliott | 29/525 |
| 3,178,206 | 4/1965 | Martin et al. | 285/238 |
| 3,434,615 | 3/1969 | Barletta | 215/1 C |
| 3,466,067 | 9/1969 | Orain | 285/244 |
| 3,484,121 | 12/1969 | Quinton | 285/381 |
| 3,744,123 | 7/1973 | Vers | 285/242 |
| 3,759,554 | 9/1973 | Carter | 285/260 |
| 3,787,547 | 1/1974 | Stephan | 264/249 |
| 3,792,797 | 2/1974 | Mrusek et al. | 220/319 |
| 3,809,304 | 5/1974 | Flanders | 150/55 |
| 3,811,367 | 5/1974 | Bimba | 29/525 |
| 3,879,044 | 4/1975 | Estes | 277/DIG. 6 |
| 3,938,237 | 2/1976 | Dunz | 285/242 |
| 4,051,992 | 10/1977 | Bergstein | 206/45.34 |
| 4,163,517 | 8/1979 | Kappler et al. | 229/4.5 |
| 4,190,196 | 2/1980 | Larsen | 220/319 |
| 4,293,147 | 10/1981 | Metcalfe et al. | 285/242 |
| 4,321,911 | 3/1982 | Offutt | 285/242 |
| 4,448,311 | 5/1984 | Houser | 220/319 |
| 4,486,036 | 12/1984 | Storke et al. | 285/242 |
| 4,497,407 | 2/1985 | Stager | 206/526 |
| 4,527,699 | 7/1985 | Namba et al. | 229/5.7 |
| 4,577,894 | 3/1986 | Wake | 285/242 |

FOREIGN PATENT DOCUMENTS 1359919 3/1964 France .................. 285/260

Primary Examiner—Jimmy G. Foster
Attorney, Agent, or Firm—Shlesinger, Arkwright & Garvey

[57] ABSTRACT

The ends of flexible plastic tubes, particularly of relatively thin thickness, are closed with a cylindrical header or end plug over which an end of the plastic tube is fitted. A fluids connection between the wall of the plastic tube and the cylindrical header or plug is made by press fitting over the connection area a plastic ring smaller in diameter than the outside diameter of the plastic tube within the elastic limit of the plastic ring. Preferably the header and/or end plug have circumferential grooves or depressions into which groove or depression the wall of the tube is fitted or depressed, preferably by multi-turns of plastic threads. For corrosive and oxidizing environments the header, plug, plastic tube, sealing rings and depressing thread are composed of perfluorocarbon polymers.

11 Claims, 1 Drawing Sheet

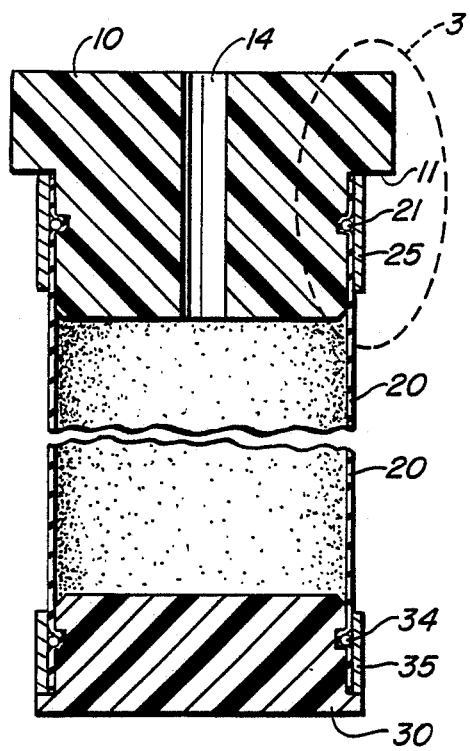
FIG._1.
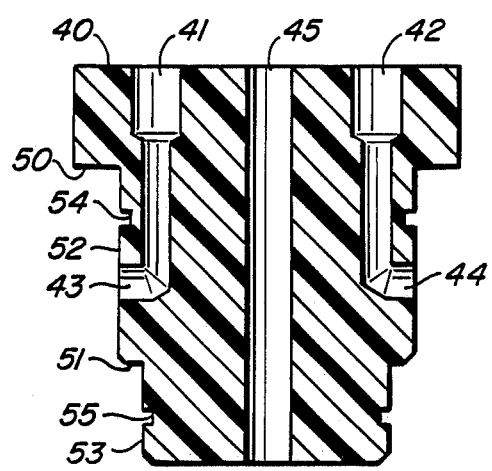
FIG._4.
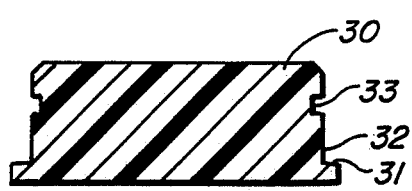
FIG._2.
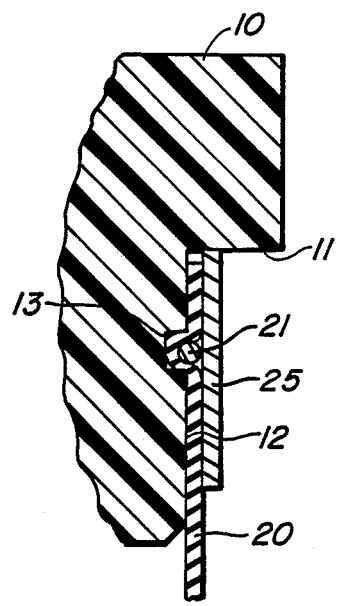
FIG._3.

END CLOSURE FOR FLEXIBLE PLASTIC TUBES

FIELD OF THE INVENTION

This invention relates to a method for closing the ends of plastic tubes used to separate fluids in electrolytic cells, chemical reactors and other fluids separators. More specifically this invention relates to a method for closing the ends of tubes of perfluorocarbon membranes used to separate fluids in cylindrical electrolytic cells and chemical reactors. The method comprises fitting the end of a plastic tube over a cylindrical header and press fitting a plastic ring smaller in diameter than the outside diameter of the plastic tube within the elastic limit of the plastic ring whereby the elastic recovery of the plastic ring effects a fluids tight connection between the wall of the plastic tube and the cylindrical header. A preferred closure for tubes of perfluorocarbon membranes with fabric reinforcement is a cylindrical fluorocarbon header with conduits for flow of fluids having a groove or depression around the circumference of said header into which groove the wall of said perfluorocarbon tube is fitted or depressed, preferably by multi turns of a perfluorocarbon thread. In this preferred embodiment, a fluorocarbon ring is press fitted over the perfluorocarbon tube, groove and header providing a chemically stable, electrically insulative, pressure tight fluids closure of the perfluorocarbon tube to the perfluorocarbon header. The instant invention provides a closure for plastic tubes that is suitable for operation in corrosive and oxidizing environments at elevated temperatures and pressures and permits close spacing of electrodes in cylindrical electrolytic cells and low volume-high surface area chemical reactors and fluids separators.

BACKGROUND OF THE INVENTION

Since the disclosure of fluorocarbon polymers containing sulfonic acid groups (U.S. Pat. No. 3,282,875) considerable progress has been made in adapting these polymers for use as a membrane in electrochemical cells and chemical reactors. Most of this work has dealt with the electrolytic production of chlorine, and caustic soda, and the nitration, sulfonation and alkylation of hydrocarbons. In these and similar applications, the membranes are used to separate fluids under pressure at operating temperature in corrosive, oxidizing chemical environments. For the production of chlorine and caustic soda, flat sheets of the membrane are pressure sealed between plastic or metal frames to form compartments in the electrolytic cell that separate the anolyte and catholyte fluids. In cylindrical electrolytic cells, tubes of a membrane are used to separate the anolyte and catholyte fluids, wherein the ends of the tubes must be closed to effect separation of the fluids and the anodic and cathodic electrical potentials. The components of the closure of the membrane tubes must be stable to the normally corrosive chemical environment at operating temperature, pressure and electrical potentials.

Perfluorocarbon sulfonic acid membranes are sold in sheet form with and without fabric reinforcement. The membrane sheets range in thickness from about 0.004 inches to 0.020 inches (Edward H. Price. The Commercialization of Ion Exchange Membranes to Produce Chlorine and Caustic Soda, 152nd National Meeting Electrochemical Society, Atlanta, Ga. October 1977). The sheets can be formed into tubes by heat sealing together two edges of the sheet which results in a cylindrical tube with a seam approximately twice the thickness of the initial sheet. The membranes absorb water and polar organic materials from about 5 to 70% of dry weight which results in large dimensional changes on hydration, solvation and drying. Fabric reinforced membranes are used to reduce dimensional changes and to improve mechanical properties but still show substantial dimension changes upon hydration under operating conditions.

Thin wall plastic tubes are not generally used to separate fluids in chemical and electrolytic processes. Heretofore, there has been no satisfactory methods for closing the ends of perfluorocarbon and other plastic tubes for use in electrolytic cells and fluid-flow reactors. Elastomeric rubber and thick wall plastic tubes are generally connected to pipes and other cylindrical headers with metal type hose clamps wherein the plastic tube is deformed to accommodate the out-of-round configuration of the clamp. The thin wall and low elasticity of the perfluorocarbon and most other plastic tubes, especially with fabric reinforcement, preclude the use of ring clamps to effect a fluid tight seal of the plastic tube to a cylindrical header. The corrosive and electrical environments, also, essentially preclude the use of metal rings and clamps. Glues and sealants can be used to connect plastic tubes to cylindrical pipes and headers. However, the large dimensional changes of perfluorocarbon membranes on hydration and solvation and the corrosive environment make glue and sealant connections unreliable or unusable. A conical header and tapered ring with tie bolts and clamps can be used to compress an elastomeric O ring on the surface of a plastic tube to effect a fluid tight connection. With corrosive and oxidizing environments the O ring usually fails in a short period with loss of compartmentation of fluids. A conical header and tapered ring assembly does not accommodate close spacing of electrodes in electrolytic cells and close spacing of plastic tubes in chemical reactors.

An object of the instant invention is to provide a method and apparatus for connecting thin wall perfluorocarbon membranes and other plastic tubes to a cylindrical header that forms a fluids tight connection suitable for pressure operation in corrosive and oxidizing environments at elevated temperatures that accommodates dimensional changes of the plastic tube and hydration, solvation and drying, permits close spacing of electrodes in electrolytic cells and chemical reactors and is easily made and removed to facilitate maintenance and repair.

BRIEF DESCRIPTION OF THE DRAWINGS

FIG. 1 is a vertical cross sectional view of a tubular membrane which is closed at each end with an end closure of the present invention.

FIG. 2 is a vertical cross sectional view of a solid end closure disassembled from the plastic tube.

FIG. 3 is an enlarged vertical cross sectional view showing in exaggerated separation the detail of the sealing of the end of a membrane into a groove and with a sealing ring in place.

FIG. 4 is a vertical cross sectional view of another end closure suitable for use with two plastic tubes of different size and concentric to each other.

DETAILED DESCRIPTION OF THE INVENTION

A method is provided for connecting thin wall plastic tubes to cylindrical headers to form fluid tight connections suitable for pressure operation in corrosive and oxidizing environments of electrolytic cells, chemical reactors, and fluids separators. The method comprises fitting a thin wall plastic tube over a cylindrical header and press fitting a plastic ring, smaller in inside diameter than the diameter of the header. A preferred connection comprises plastic tube and header. A preferred connection comprises (a) fitting a plastic tube over a cylindrical header having a groove or depression around the circumference of the header, (b) press fitting the wall of the plastic tube into the groove, especially by multi wraps of a thread and (c) press fitting the plastic ring over the plastic tube, groove and header. While one groove is usually adequate, more than one groove and other depression forms can be used. It is preferable to use a glue or sealant between the plastic tube and header when a surface of the tube or header is rough or irregular or when the plastic tube contains a fabric reinforcement. By these means, thin wall plastic tubes can be connected to cylindrical headers to effect separation of fluids up to the burst pressure of the plastic tube. The connection is easily made and removed, and is suitable for repeated use. The connection permits close spacing of electrodes and membranes in an electrolytic cell with an electrically insulative connection.

The header of the connector assembly of this invention must be cylindrical in shape and of the dimensions required to fit into the plastic tube. The header can be a pipe, a solid cylinder, a cylinder with conduits for flow of fluids or a cylindrical header with conduits for flow of fluids, electrode and other assemblies. The header can be of plastic, ceramic or metal with or without fillers and reinforcements. The preferred headers are substantially chemically stable to the process conditions, mechanically and chemically suitable for economical design and operation of the processes. The preferred header for strong oxidizing media in electrochemical cells is composed of perfluorocarbon, such as Teflon ®, and is shaped to fit the inside dimensions of the selected plastic tube.

The groove or depression around the circumference of the header can vary widely in shape and dimensions depending on the characteristics of the plastic tube, e.g., thickness and stiffness and the method and dimensions of the material used to fit the wall of the plastic tube into the groove. The groove can be, for example, V shaped, a straight wall-flat bottom groove, a curve wall-flat bottom, a round bottom-slanted wall groove. The groove can be wide and shallow or narrow and deep. The dimensions of the groove in this embodiment must be such that the wall of the plastic tube and the material used to press the tube into the groove permits press fitting a plastic ring over the plastic tube-groove and header and effecting a fluids tight connection between the plastic tube, groove and header. The minimum depth of the groove is about twice the thickness of the plastic tube when using multiwraps of a thread or filament to press the wall of the tube into the groove. Preferably the depth of the groove is about ten times the wall thickness of the plastic tube. A preferred groove for a perfluorocarbon membrane with Teflon ® fabric reinforcement having a thickness of 0.017 inches is a straight wall-flat bottom groove about 0.125 inches wide and about 0.125 inches deep with the wall of the membrane press fitted into the groove with multiwraps of a Teflon ® thread. It will be apparent to one skilled in the art that the primary function of the groove or depression is to prevent the plastic tube from moving on the header and that the secondary function is to effect a fluids tight seal of the plastic tube to the header and that the shape and dimensions of the groove and the method of fitting and holding the wall of the tube in the groove must meet the primary function and preferably the primary and secondary functions. Hence, although generally less preferable than a true groove, variations such as ribs to form therebetween a depression can be used.

The plastic ring that is press fitted over the plastic tube and cylindrical header must be smaller in diameter than the outside diameter of the plastic tube when the plastic tube is fitted on the header. The plastic ring preferably must be sufficiently elastic to expand to the diameter required for press fitting over the plastic tube and header without permanent deformation of the plastic structure, (within the elastic limit of the plastic where Hooke's law applies—the ratio of the stress to the strain produced is constant). The force (hoop stress) required to expand the ring is dependent on the plastic, the temperature of the ring, the wall thickness, modulus of elasticity and other characteristics of the ring affecting press fitting of the ring over the plastic tube and header. The stress-strain data is readily available for most plastics and the hoop stress for the ring at different strain (elastic deformation) can be calculated or determined experimentally by standard methods. At operating temperature the ring should exert sufficient force to effect a fluids tight seal between the plastic tube and header. The ring should be chemically and mechanically stable in the process environment. The width of the ring can vary over a wide range depending on the size of the plastic tube and header. The width of the groove in the header should be sufficient to effect a seal of the tube to the header. The width of the ring should be sufficient to cover the groove and effect a fluid tight seal. The diameter or inside circumference of the ring preferably must be less than the diameter of the header plus twice the wall thickness of the plastic tube or less than the circumference of the plastic tube fitted on the header. The elastic expansion of the ring to fit over the plastic tube and header should be within the elastic limit of the plastic but sufficient to effect the desired connection of the tube to the header at process conditions. For example, with a Teflon ® header 2.50 inches in diameter fitted with a Nafion ® perfluorinated membrane 427 of 0.017 inch wall thickness, a Teflon ® ring 1.0 inch wide, 0.125 inch wall thickness and inside diameter of 2.517 to 2.520 inches can be used to effect a fluids tight seal of the membrane to the header for operation at 45° to 50° C. The ring can be made from any polymer that has an elastic limit sufficient to permit the use of a ring smaller in diameter than the outside diameter of the plastic tube, or the diameter of the header plus two wall thicknesses of the plastic tube or the inside circumference of the ring is less than the circumference of the plastic tube fitted on the header. Preferably the polymer is chemically stable to the process environment and retains its physical and mechanical properties for extended periods at process conditions. Perfluorocarbon polymers such as Teflon ® TFE and PFA are preferred for making the rings. These polymers are especially chemically stable and retain physical and mechanical properties at elevated temperatures for extended periods in corrosive and oxidizing environments. The ring can be fabricated from the polymers using conventional techniques, such as centering, extruding, molding, casting with or without milling and machining.

Any plastic tube with or without reinforcements, filters and additives can be used in this embodiment if the wall thickness and stiffness of the tube are suitable for making a fluids tight seal between the tube wall and a cylindrical header by press fitting a plastic ring over the tube and header or by the use of a groove around the circumference of the header into said groove the wall of the plastic tube is press fitted and a plastic ring is press fitted over the plastic tube, header and groove.

The thin walled tubes or sleeves used as the membranes preferably have ion permeable selectivity, most preferably cation permeably selectivity and should be sufficiently thin for efficient selectivity consistent with adequate strength. The membranes of most significance are those that undergo substantial dimensional changes (such as at least 2%, more importantly more than 5 or 10%) when going from ambient dry conditions to hydrated conditions in aqueous solutions, such as electroplating baths and the like. The preferred tubes are perfluorocarbon membrane tubes suitable for use in electrolytic cells, fluids separators and chemical reactors and are membrane tubes ranging in thickness from about 0.004 inches to about 0.030 inches and in diameter from about 0.2 inches to about 12.0 inches, as measured under ambient dry conditions.

The wall of the plastic tube can be fitted into the groove of the cylindrical header by any thread, filament, tape or ring that is mechanically suitable and sufficiently inert to the chemical environment for economical operation. Preferably, a thread, filament or tape is wrapped under tension several turns in the groove of the header to fit the wall of the plastic tube in the header and to effect a seal between the header and plastic tube. For corrosive and oxidizing environments, a perfluorocarbon thread filament or tape is preferred.

Any glue or sealant can be used between the plastic tube and header that is substantially insoluble in the process fluids and chemically compatible for use with the plastic tube and header. Preferably the glue or sealant is substantially inert to the process fluids, at operating conditions and can be easily removed from the plastic tube and header. A silicone glue and sealant, e.g., a Dow Corning 100% silicone rubber general purpose sealant is preferred for use with perfluorocarbon membranes in corrosive and oxidizing environments.

Referring to the drawings, FIG. 1 illustrates an embodiment with end closures for a thin wall plastic tube such as a perfluorocarbon sulfonic acid membrane. The upper end closure body 10, preferably formed of perfluorocarbon such as Teflon, has a cylindrical shape and is formed with a shoulder 11 and an upper face 12 having a circumferential groove 13. The end closure 10 can have various ports such as conduit 14 and other ports (not shown) for passage of fluids through the body of the end closure as well as for introducing electrodes.

To the cut-in section of end closure body 10 is fitted the thin walled plastic tube 20, the cut-in section at the circumferential surface 12 of the end closure being formed to fit snugly into the end of tube 20. The end of tube 20 is fastened into place for a fluids tight seal by depressing a portion of the tube into groove 13, preferentially with suitable windings 21 such as of perfluorocarbon (e.g., Teflon ® thread.

Over and around the depressed and end portion of tube 20 is press fitted a ring 25 which normally has a smaller inside diameter than the outside of end portion of tube 20 in place about surface 12 on the end closure 10 with the end of ring 25 up against shoulder 11. As indicated hereinabove, ring 25 is sufficiently elastic to expand to the diameter for such press fitting.

FIG. 3 shows the preferred form of depressing the plastic tube 20 into groove 13 with the windings 21 and sealing ring 25.

In a similar manner the lower end of the tube 20 can be closed as shown in FIG. 1 by another end closure 30 having a similar cut-in or stepped-down section with a shoulder 31, a seal surface 32, a groove 33, membrane depressed into the groove by windings 34 and sealed with a seal ring 35 up against shoulder 31. In this case the end closure is shown without ports therethrough and acts as a solid plug for the end of membrane 20. This type of closure is attached directly to the tube and is not otherwise fixed so that the membrane can lengthen without being restrained by a closure in a fixed position.

FIG. 2 shows end closure 30 disassembled from the membrane tube 20.

Another embodiment of an end closure is illustrated in FIG. 4. In this embodiment the end closure 40 is shown to have passageways 41 and 42 to side ports 43 and 44, respectively, for fluid circulating and a straight through passage 45, for fluid flow or introduction of an electrode. Other passageways can be provided as desired End closure 40 is formed with two stepped-down shoulders 50 and 51 and seal faces 52 and 53 with respective circumferential grooves 54 and 55. It will be seen that different diameter concentric tubes such as ion permeable membranes can be fitted and sealed fluids tight against the seal surfaces 52 and 53 respectively.

While the invention has been illustrated with the preferred grooves in the seal faces of the end closures, this invention pertains more broadly to end closures without such grooves or depressions. In such structure the ends of the thin walled plastic tubes are fastened to and kept in position with a fluids tight seal under most operating conditions by means of the seal rings which have a normally smaller inside diameter than the diameter of the plastic tube and end closure at the seal surfaces and which rings are under elastic strain as discussed hereinabove.

The following are examples illustrating the above closure system, the dimensions being in inches unless noted:

EXAMPLE 1

The ends of a Nafion perfluorinated 324 membrane tube was closed with cylindrical headers of Teflon TFE perfluorocarbon resin to form a cathode compartment for a cylindrical electrolytic cell for separation of an aqueous catholyte and hydrogen formed at the cathode from an aqueous anolyte and oxygen formed at the anode. The Nafion ® tube had an inside diameter of 2.50, a wall thickness of 0.017 and length of 36 at 50% relative humidity. The membrane contained a fabric reinforcement of Teflon TFE resin, a perfluorocarbon polymer. The tube was formed from a sheet of Nafion perfluorocarbon sulfonic acid resin by heat sealing. The heat seal width was 0.42 and the wall thickness at the heat seal 0.028. One end of the tube was closed with a cylindrical header of Teflon ® TFE resin having a cathode assembly and conduits for flow of an aqueous catholyte. The other end of the tube was closed with a cylindrical end plug of Teflon ® with no conduits. The diameter of the header and plug was 2.50 with a seal area 0.75 long. Rings of Teflon ® TFE resin having an inside diameter of 2.517, wall thickness 0.125 and length 0.75 was used to press fit over the tube and header. The Nafion ® tube was fitted over the header seal area having a thin coating of uncured silicone rubber sealant. The Teflon ® rings were press fitted over the Nafion ® tube and header seal area to form a liquid tight cathode compartment. The cathode compartment assembly was fitted with an anode external to the membrane and the electrolytic cell was used to purify chromic acid plating liquor having about 32 oz. per gal. of chromic acid and 0.32 oz. per gal. of sulfuric at 140° F. After six months of operation the cell was removed and the closures examined. There was no leakage of fluids from the cathode compartment at a hydrostatic pressure of 3 psi and the closure assembly was as initially formed.

EXAMPLE 2

The closure components of Example 1 were used to form a cathode compartment. A flat bottom-straight wall groove was machined around the circumference of the Teflon ® header at the seal area. The groove was 0.125 deep and 0.125 wide. The compartment was formed by fitting the membrane tube over the header at the seal area and press fitting the wall of the tube into the groove containing a thin coating of uncured silicone rubber sealant by winding under tension 20 turns of a Teflon ® thread into the groove. The Teflon ® rings were press fitted over the membrane tube, groove and seal area. The cathode compartment was hydrostatically tested at 10 psi for 24 hours. There were no leaks. The cathode assembly was equipped with an anode and used for three months in the chromic acid plating bath of Example 1. After three months there were no leaks at a hydrostatic pressure of 10 psi.

EXAMPLE 3

A membrane reactor was made by inserting a porous metal element inside an unreinforced tube of Nafion ® perfluorosulfonic acid resin and connecting the tube to nonporous seal areas on the metal element. The Nafion ® tube had an inside diameter of 1.05, wall thickness of 0.005 and length of 36 at 50% relative humidity. The membrane was saturated with water at 25° C. to effect swelling and increase in dimensions. The swollen tube was pulled over the porous element having an external diameter of 1.315, a length of 36 and a non-porous seal area 1.315 diameter having a V-shaped groove 0.065 wide and 0.065 deep. The wall of the tube was press fitted into the groove by winding under tension 10 turns of a Teflon ® thread into the groove over the wall of the tube. A Teflon ® ring inside diameter 1.318 wall thickness 0.215 and length 1.0 was press fitted over the tube groove and seal area. The porous metal element and membrane assembly was sealed into a reactor vessel and pressure tested. The hydrostatic pressure was applied against the external surface the membrane tube. There were no leaks at a hydrostatic pressure of 55 psi. The reactor was used for the nitration of benzene.

EXAMPLE 4

The ends of a polypropylene tube with an inside diameter of 4.18, wall thickness 0.007 were closed with a cylindrical polypropylene header with a diameter of 4.18 with a flat bottom straight wall groove 0.125 wide and 0.125 deep around the circumference of a seal area 0.75 long. The polypropylene tube was fitted over the seal area of the header and the wall of the tube press fitted into the groove by tension winding 20 turns of an oriented polypropylene tape 0.110 wide and 0.005 thick into the groove. A polypropylene ring with an inside diameter of 4.10, wall thickness 0.125 and length 0.5 was press fitted over the tube, groove and header. The enclosure was leak tested up to the burst pressure of the tube without leakage.

A variety of plastic tubes varying in diameter and wall thickness were connected to headers with and without grooves using plastic rings expanded within the elastic limit of the plastic. In all cases a fluids tight connection was made between the wall of the plastic tube and the cylindrical header. The preferred connections for pressure operation at elevated temperatures were those connections where the wall of the plastic tube was press fitted into a groove with or without a sealant and a plastic ring press fitted over the tube, groove and header.

I claim:

1. A closure for and in combination with a flexible tube having a wall thickness of 0.001 to 0.050 inches which combination is adapted to being disassembled and reassembled, comprising
   a cylindrical shape inserted into and fitting snugly within said tube, and
   a cylindrical plastic ring over said tube around said cylindrical shape within said tube, said plastic ring being press-slipped over said tube on said cylindrical shape, said plastic ring being under sufficient elastic strain in tension and sufficient width to exert a sufficient compressive force on said tube on said cylindrical shape to effect an interference fit between said tube and said cylindrical shape to make a fluids tight closure between said tube and said cylindrical shape.

2. The closure of claim 1 wherein said ring is composed of a plastic having a modulus of elasticity such that when said plastic ring is press-fitted over said tube said ring is under an elastic strain within the elastic limit of said plastic where the ratio of the stress to the strain produced by said press-fitting is constant and said elastic strain of said plastic ring by itself exerts a force sufficient to effect a fluids tight seal between said tube and said cylindrical shape.

3. The closure of claim 1 wherein said plastic ring has an internal diameter that allows it to fit slidably around said cylindrical shape in the absence of said flexible tube.

4. The closure of claim 1 wherein said ring is sufficiently elastic to be press-fitted without permanent deformation and is composed of a plastic capable of an elastic strain no more than a small percentage within its elastic limit.

5. The closure of claim 1 wherein said combination comprises a cylindrical shape with an external surface, a flexible tube having external and internal cylindrical surfaces and a plastic ring having an internal cylindrical surface, all of said surfaces being parallel to each other and being in interference fit from the recovery tendency of said plastic ring in tension from said press-fitting.

6. The closure of claim 1 wherein said plastic ring is composed of a polymer selected from perfluorocarbon and propylene polymers.

7. The closure of claim 1 wherein said thin flexible tube is composed of an ion permeable perfluorocarbon polymer membrane.

8. The closure of claim 1 wherein said tube, said cylindrical shape and plastic ring are non-metallic and composed of perfluorocarbon polymers.

9. The closure of claim 8 wherein said wrapping is multiple turns of a perfluorocarbon thread.

10. A closure for and in combination with a flexible cylindrical tube having a wall thickness of 0.001 to 0.050 inches which combination is adapted to being disassembled and reassembled, comprising
  a cylindrical shape inserted into and fitting snugly within said tube, said cylindrical shape having a circumferential groove in its surface facing said tube,
  a wrapping around the exterior of said tube depressing into said groove the portion of said tube circumferentially over said groove, and
  a cylindrical plastic ring of smaller normal internal diameter than the external diameter of said tube around said inserted cylindrical shape, said ring being press slipped over said tube on said cylindrical shape, said plastic ring being under sufficient elastic strain in tension and sufficient width to cover said groove and wrapping and to exert a sufficient compressive force on said tube on said cylindrical shape to effect an interference fit between said tube and said cylindrical shape to make a fluids tight closure between said tube and said cylindrical shape.

11. The method of connecting a flexible tube having a wall thickness of 0.001 to 0.050 inches to a cylindrical shape comprising
  inserting within said tube a cylindrical shape having a circumferential groove and of dimensions to fit snugly within said tube,
  depressing a circumferential portion of said tube into said groove with wrappings of smaller cross-sectional dimensions than said groove, and
  forcing a cylindrical plastic ring into position with said ring under outward elastic strain over the portion of said tube depressed into said groove, said ring having a normal internal diameter smaller than the external diameter of said tube and wrapping, and said ring is sufficiently elastic to be so forced into said strained position without permanent deformation and is composed of a plastic capable of an elastic strain no greater than a small percentage within its elastic limit, whereby the elastic recovery of said ring under stress effects a fluids tight connection between said tube and said cylindrical shape.

* * * * *

UNITED STATES PATENT AND TRADEMARK OFFICE
CERTIFICATE OF CORRECTION

PATENT NO. : 4,750,525

DATED : June 14, 1988

INVENTOR(S) : Daniel J. Vaughan

It is certified that error appears in the above-identified patent and that said Letters Patent is hereby corrected as shown below:

Column 3, Line 11: "than the diameter of the header
  should read         and plastic tube, over the plastic
                              tube and header.

Signed and Sealed this

Twenty-first Day of February, 1989

*Attest:*

DONALD J. QUIGG

*Attesting Officer*          *Commissioner of Patents and Trademarks*